F. C. RAWLEY.
FARM GATE.
APPLICATION FILED SEPT. 7, 1920.
1,388,484.
Patented Aug. 23, 1921.
2 SHEETS—SHEET 1.
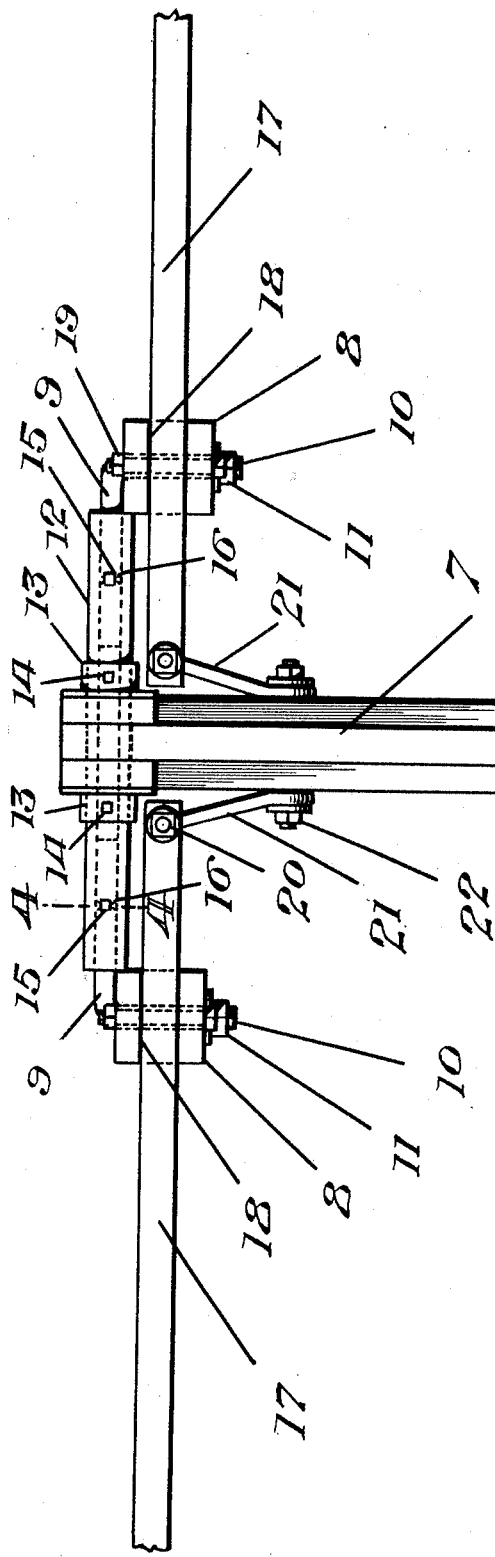
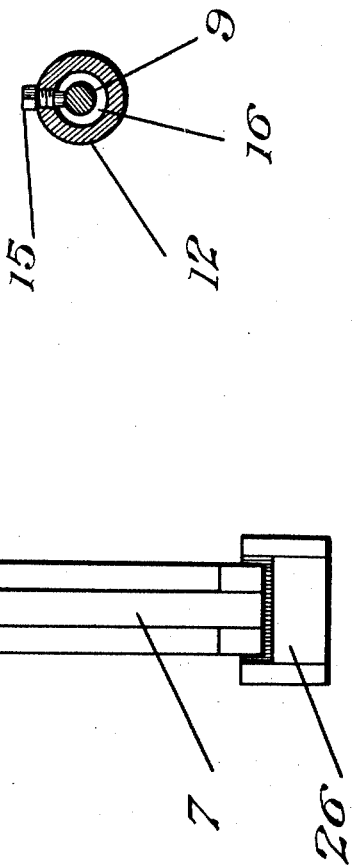
INVENTOR
F. C. RAWLEY
by W. J. Fitz Gerald & Co.
ATTORNEY

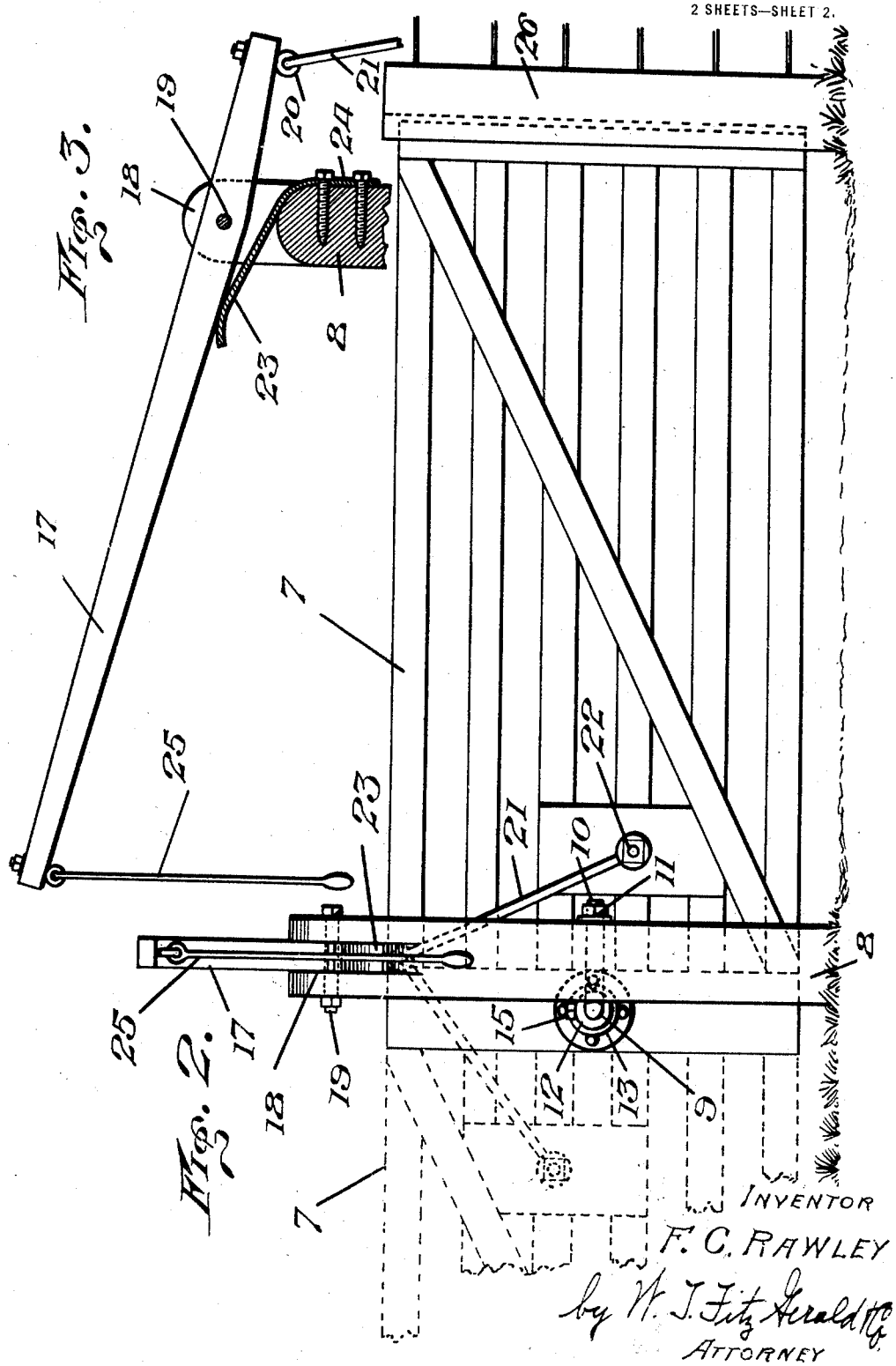

UNITED STATES PATENT OFFICE.

FLEMING C. RAWLEY, OF HOUSTON, TEXAS.

FARM-GATE.

1,388,484.  Specification of Letters Patent.  Patented Aug. 23, 1921.

Application filed September 7, 1920. Serial No. 408,667.

*To all whom it may concern:*

Be it known that I, FLEMING C. RAWLEY, a citizen of the United States, residing at Houston, in the county of Harris and State of Texas, have invented certain new and useful Improvements in Farm-Gates; and I do hereby declare the following to be a full, clear, and exact description of the invention, such as will enable others skilled in the art to which it appertains to make and use the same.

The present invention relates to farm gates, and aims to provide a novel and improved hinge mounting for a gate to enable the gate to swing about a horizontal transverse axis in a vertical plane to and from closed position, and such hinge device also serving as a stay or brace connecting a pair of posts supporting the gate.

A further object is the provision of a novel mounting and operating means for such a gate, including springs for raising the operating levers used in moving the gate.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the gate, showing the mounting and operating means thereof.

Fig. 2 is a side elevation thereof, showing the gate in open position in dotted lines.

Fig. 3 is an elevation of one of the operating levers showing the upper end portion of the respective post in section.

Fig. 4 is an enlarged sectional detail taken on the line 4—4 of Fig. 1.

The gate proper, designated at 7, can be of any suitable construction, either wood or metal, and one end thereof is hingedly supported between a pair of posts 8 for swinging movement about a horizontal transverse axis in a vertical plane. This hinge mounting includes a pair of hinge rods 9 disposed transversely of the gate in alinement with one another at the opposite sides of the gate, and provided at their opposite ends with securing portions 10 extending at right angles and passing through the posts 8 parallel with the gate, with nuts 11 or other retaining means engaged on the portions 10 for securing them to the posts. A hinge tube or sleeve 12 has its end portions telescoped over the rods 9 to rotate thereon, and said tube extends through the corresponding end portion of the gate, to support same, collars 13 being fitted on the tube at the opposite sides of the gate and being secured by means of set screws 14, or the like, to retain the gate in position.

The rods 9 and tube 12 are constrained against separation, so that the hinge serves as a brace or stay between the posts 8, and, as shown, the tube 12 carries screws or keys 15 engaging in grooves 16 in the rods 9, to prevent the separation of said rods and tube, although permitting the tube to turn with the gate in opening and closing same.

A substantial hinge mounting for the gate is thus provided, which also serves as a brace or stay for the posts.

The operating means for the gate includes a pair of levers 17 disposed at opposite sides of the gate and extending to points for conveniently opening and closing the gate before and after passing through the gateway. The levers 17 are mounted on the posts 8, which have their upper ends bifurcated or slotted, as at 18, to receive the levers, and in which the levers are fulcrumed, as at 19. The levers have short arms projecting from the posts toward the gate, and provided with eye bolts 20, or the like, connected by links or rods 21 with the opposite sides of the gate near the hinge, as at 22, and the connection 22 is so arranged, that when the gate is closed and either lever 17 is swung downwardly at its longer arm, the corresponding link or rod 21 will impart an upward pull to the gate, thereby swinging it upwardly over the hinge mounting to reversed longitudinal position, as seen in dotted lines in Fig. 2, thereby opening the gate. Then, when the vehicle or pedestrian has passed through the gateway, the other lever is pulled down, so that the gate is again pulled upwardly, to swing over the hinge, and return to closed position.

A leaf spring 23 is secured, as at 24, to one side of each post 8, and extends through the slot or bifurcated portion under the fulcrum 19 of the corresponding lever to bear upwardly against the long arm of the lever, so as to raise the long arm and normally hold the lever in proper position for operation, said spring being bent down with the long arm of the lever when the lever is swung to operate the gate. A cord 25 is suspended from the end of the long arm of each lever for conveniently pulling said lever down, and when the gate is closed, the free end thereof moves adjacent to the post 26 positioned at that side of the gateway opposite to the posts 8.

Having thus described the invention, what is claimed as new is:—

A gate structure comprising a pair of posts, a gate between them, a hinge tube extending through the gate, collars on said tube bearing against opposite sides of said gate, a pair of alining transverse rods fitted within the opposite end portions of said tube and having at their opposite end portions extending at an angle and engaging through said posts parallel with the gate, means on the opposite ends of said rods for securing same to said posts, said rods having grooves within said tube, and means carried by the tube engaging in said grooves for holding the tube and rods together for the turning movement of the tube on the rods.

In testimony whereof I have signed my name to this specification in the presence of two subscribing witnesses.

F. C. RAWLEY.

Witnesses:
W. A. ROWE,
T. W. BUSSEY.